(12) United States Patent
Shimanaka

(10) Patent No.: US 11,418,537 B2
(45) Date of Patent: Aug. 16, 2022

(54) MALWARE INSPECTION APPARATUS AND MALWARE INSPECTION METHOD

(71) Applicant: FUJITSU LIMITED, Kawasaki (JP)

(72) Inventor: Toru Shimanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 392 days.

(21) Appl. No.: 16/226,816

(22) Filed: Dec. 20, 2018

(65) Prior Publication Data

US 2019/0207952 A1 Jul. 4, 2019

(30) Foreign Application Priority Data

Jan. 4, 2018 (JP) .............................. JP2018-000319

(51) Int. Cl.
*H04L 9/40* (2022.01)
*G06F 21/53* (2013.01)
*G06F 21/55* (2013.01)

(52) U.S. Cl.
CPC ............ *H04L 63/145* (2013.01); *G06F 21/53* (2013.01); *G06F 21/554* (2013.01); *H04L 63/1416* (2013.01); *G06F 2221/2105* (2013.01); *H04L 63/1491* (2013.01)

(58) Field of Classification Search
CPC ............... H04L 63/145; H04L 63/1416; H04L 63/1491; G06F 21/53; G06F 21/554; G06F 2221/2105

See application file for complete search history.

(56) References Cited

U.S. PATENT DOCUMENTS

| | | | |
|---|---|---|---|
| 2010/0118717 A1 | 5/2010 | Suzuki et al. | |
| 2012/0254951 A1 | 10/2012 | Munetoh et al. | |
| 2017/0019425 A1* | 1/2017 | Ettema | G06F 9/45558 |
| 2017/0223052 A1* | 8/2017 | Stutz | H04L 63/1433 |
| 2018/0375897 A1* | 12/2018 | Kawasaki | H04L 63/1491 |

FOREIGN PATENT DOCUMENTS

| | | |
|---|---|---|
| JP | 2008-172548 | 7/2008 |
| JP | 2012-212391 | 11/2012 |
| JP | 2016-92763 A | 5/2016 |

OTHER PUBLICATIONS

Japanese Office Action dated Sep. 14, 2021 for corresponding Japanese Patent Application No. 2018-000319, with English Translation, 6 pages.

* cited by examiner

*Primary Examiner* — Theodore C Parsons
(74) *Attorney, Agent, or Firm* — Fujitsu Patent Center

(57) ABSTRACT

A malware inspection apparatus includes one or more memories, and one or more processors configured to, when a first terminal belonging to a first system is infected with malware, in response to receiving, from the first terminal, a first packet destined for a second terminal belonging to the first system, change a destination address of the first packet to an address of a third terminal belonging to a second system, and send the changed first packet to the third terminal.

9 Claims, 8 Drawing Sheets

MALWARE INSPECTION APPARATUS AND MALWARE INSPECTION METHOD

CROSS-REFERENCE TO RELATED APPLICATION

This application is based upon and claims the benefit of priority of the prior Japanese Patent Application No. 2018-319, filed on Jan. 4, 2018, the entire contents of which are incorporated herein by reference.

FIELD

The embodiments discussed herein are related to malware inspection techniques.

BACKGROUND

In recent years, cyberattacks, such as unauthorized access via a network, have raised serious concerns. To deal with such cyberattacks, it is important to collect cyber threat intelligence (CTI) in which information on attackers, purposes, attack techniques, attack methods, and so on obtained by observing the cyberattacks is summarized in a report or the like. As existing techniques for collecting CTI, unauthorized access information systems that monitor unauthorized access to a honeynet and collect unauthorized access information are known.

Related techniques are disclosed in, for example, Japanese Laid-open Patent Publication No. 2008-172548 and Japanese Laid-open Patent Publication No. 2012-212391.

SUMMARY

According to an aspect of the embodiments, a malware inspection apparatus includes one or more memories, and one or more processors configured to, when a first terminal belonging to a first system is infected with malware, in response to receiving, from the first terminal, a first packet destined for a second terminal belonging to the first system, change a destination address of the first packet to an address of a third terminal belonging to a second system, and send the changed first packet to the third terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
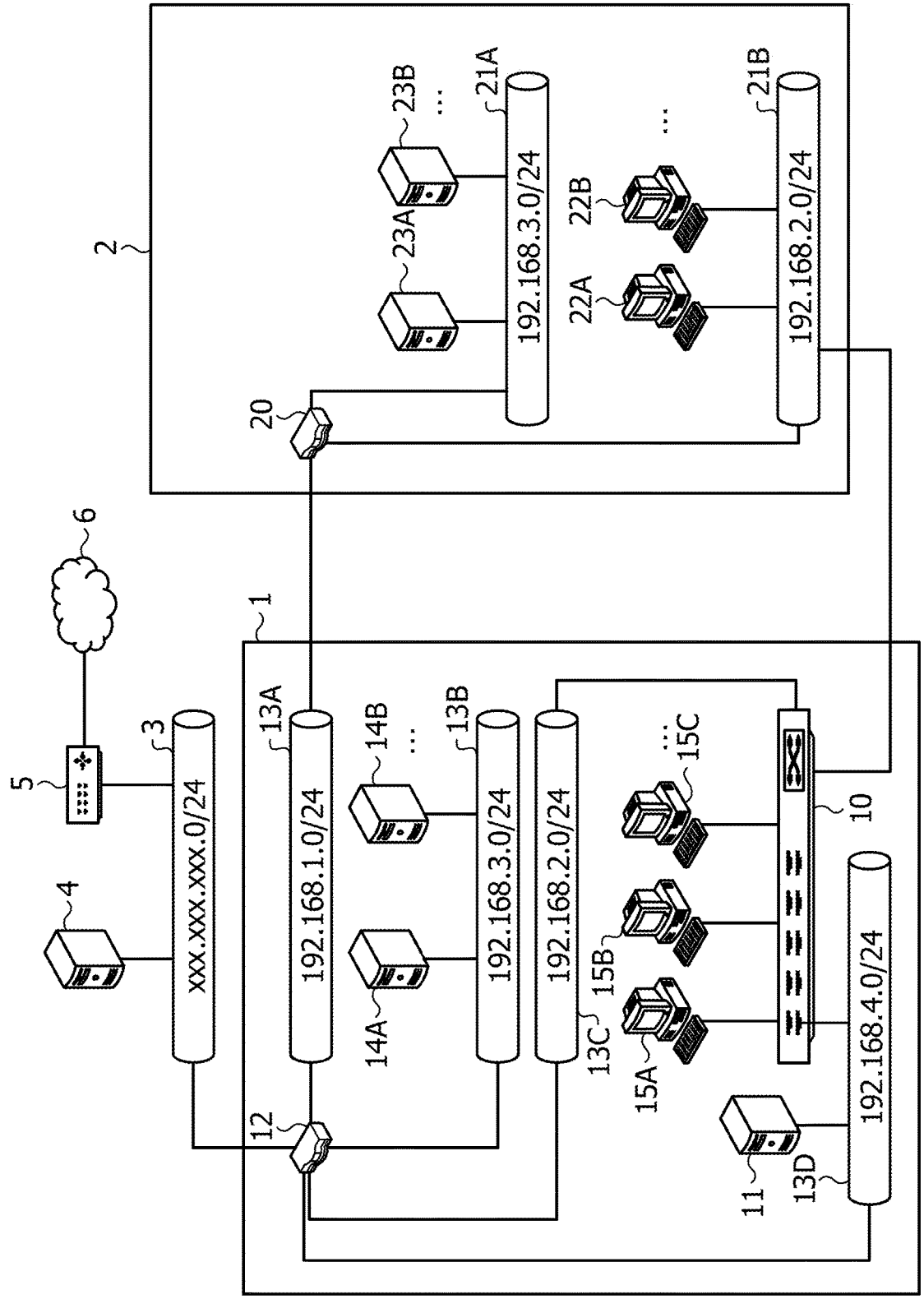
FIG. 1 is a diagram illustrating an example of a configuration of a system.

In the existing techniques, for example, unauthorized access from outside the system of a company or the like is monitored by a dedicated honeypot, and CTI is collected. With the existing techniques, however, it is difficult to safely monitor the behavior of personal computers (PCs) and the like infected with malware in a system controlled by a command and control (C&C) server located outside the system, and to collect CTI.

Hereinafter, a malware inspection program, a malware inspection method, and a malware inspection apparatus according to embodiments will be described with reference to the accompanying drawings. In embodiments, the same reference numerals are used for a configuration having the same functions and redundant description thereof is omitted. A malware inspection program, a malware inspection method, and a malware inspection apparatus described in the following embodiments are merely exemplary and are not intended to limit embodiments. The following embodiments may be combined as appropriate to the extent inconsistent therewith.

FIG. 1 is a diagram illustrating an example of a configuration of a system. As illustrated in FIG. 1, a system according to an embodiment includes a company network system 1 in a company or the like and a honey network system 2 in which the network configuration of the company network system 1 is mimicked. The company network system 1 is an example of a first system and the honey network system 2 is an example of a second system.

The company network system 1 is connected to an external network 3 with a classless inter-domain routing (CIDR) notation of, for example, xxx.xxx.xxx.0/24. The external network 3 includes a C&C server 4 that plays a role of, for example, issuing an instruction to terminals in the company network system 1 infected with malware to control the terminals. The external network 3 is connected to an external router 5 via the Internet 6 and the like.

The company network system 1 includes an OpenFlow switch 10, an OpenFlow controller 11, a network address translation (NAT) router 12, servers 14A, 14B . . . , and terminals 15A, 15B, 15C . . . .

The OpenFlow switch 10 is a network switch that relays and forwards data between devices connected to ports under control of the OpenFlow controller 11. The OpenFlow controller 11 delivers a flow table related to path control, such as operations for packets under given conditions, to the OpenFlow switch 10 by using an OpenFlow protocol and sets the flow table.

The flow table delivered to and set in the OpenFlow switch 10 by the OpenFlow controller 11 is created by a setting operation performed by a network administrator or the like of the company network system 1. In the flow table, operations, such as packet passage/interception, overwriting of media access control (MAC) addresses and Internet protocol (IP) addresses, and changing of output ports, in the fields of physical port numbers, source and destination MAC addresses, source and destination IP addresses, transmission control protocol (TCP)/user datagram protocol (UDP) port numbers, and the like are represented. The OpenFlow switch 10 performs forwarding and discarding of data, overwriting of destination addresses, and the like based on the set flow table.

Figure 2:
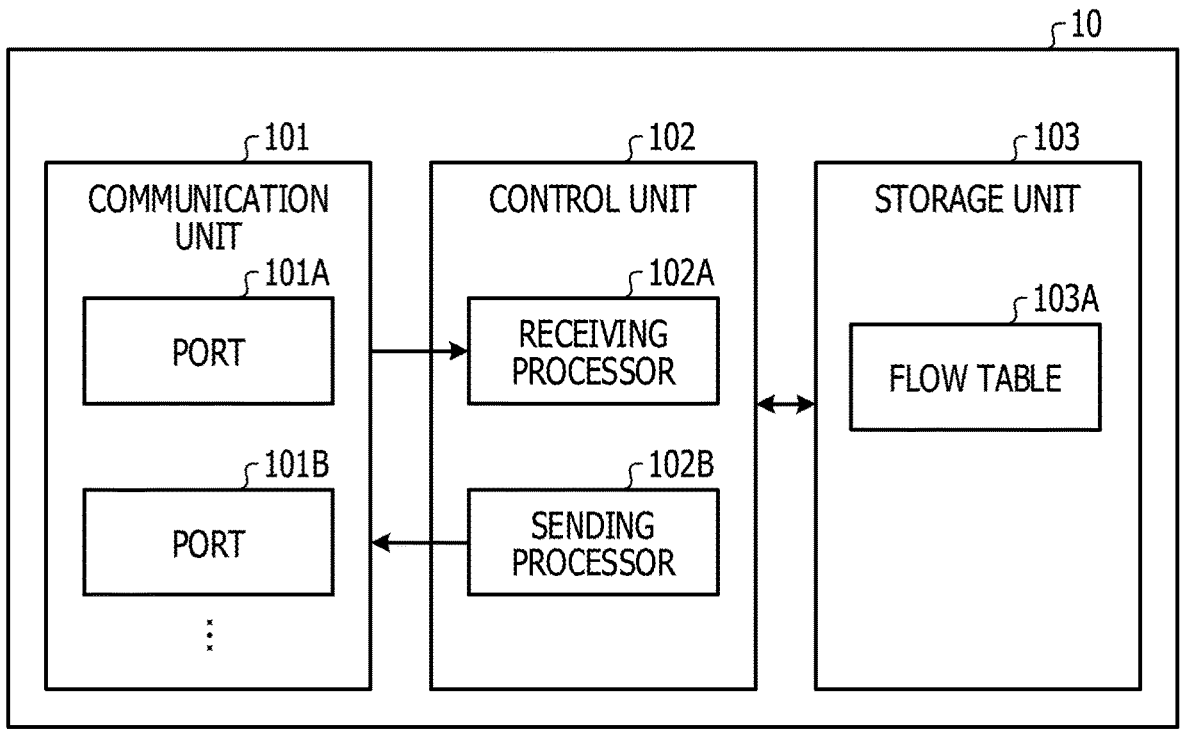
FIG. 2 is a block diagram illustrating a functional configuration of a communication device according to an embodiment.

FIG. 2 is a block diagram illustrating a functional configuration of the OpenFlow switch 10 according to the embodiment. As illustrated in FIG. 2, the OpenFlow switch 10 includes a communication unit 101, a control unit 102, and a storage unit 103. The OpenFlow switch 10 is an example of a malware inspection apparatus.

The communication unit 101 is a communication interface that performs data communication using packets with devices (for example, the terminals 15A, 15B, 15C . . . ) connected thereto via ports 101A, 101B . . . under control of the control unit 102.

The control unit 102 includes a receiving processor 102A and a sending processor 102B and controls operations of the OpenFlow switch 10. For example, the control unit 102 controls forwarding and discarding of data, overwriting of destination addresses, and the like between devices connected to the ports 101A, 101B . . . based on a flow table 103A stored in the storage unit 103.

The storage unit 103 is, for example, a storage device such as a hard disk drive (HDD) or a semiconductor memory and stores therein the flow table 103A delivered by the OpenFlow controller 11.

The receiving processor 102A performs reception processing to receive packets sent by devices (for example, the terminals 15A, 15B, 15C . . . of the company network system 1, the terminals 22A, 22B . . . of the honey network system 2, and so on) connected to the ports 101A, 101B . . . . That is, the receiving processor 102A is an example of a receiving unit.

The sending processor 102B references the flow table 103A stored in the storage unit 103 and, based on the flow table 103A, performs sending processing to send packets received by the receiving processor 102A to the destination devices (for example, the terminals 15A, 15B, 15C . . . of the company network system 1, the terminals 22A, 22B . . . of the honey network system 2, and so on). That is, the sending processor 102B is an example of a sending unit.

For example, the sending processor 102B outputs (sends) packets that meet conditions described in the flow table 103A, from the ports 101A, 101B . . . , through operations (for example, packet passage/interception, overwriting of MAC addresses and IP addresses, and changing of output ports) described in association with the conditions.

The network address translation (NAT) router 12 is a router device that translates IP addresses and the like to connect networks 13A to 13C in the company network 1 to the external network 3.

The network 13A is a network, with a CIDR notation of, for example, 192.168.1.0/24, to which the NAT router 12 in the company network system 1 and a NAT router 20 in the honey network system 2 belong. The network 13B is a network, with a CIDR notation of, for example, 192.168.3.0/24, to which the servers 14A, 14B . . . in the company network system 1 belong.

The network 13C is a network, with a CIDR notation of, for example, 192.168.2.0/24, to which the terminals 15A, 15B, 15C . . . in the company network system 1 belong. The network 13D is a network, with a CIDR notation of, for example, 192.168.4.0/24, to which the OpenFlow controller 11 belongs.

The OpenFlow switch 10 is connected to the terminals 15A, 15B, 15C . . . at the respective ports and is connected to the network 13D and a network 21B of the honey network system 2 at predetermined ports.

The servers 14A, 14B . . . are server devices such as Web servers belonging to the company network system 1. Hereinafter, the servers 14A, 14B . . . may be referred to as servers 14 if they are not to be discriminated from one another.

The terminals 15A, 15B, 15C . . . belong to the company network system 1 and are information processing devices, such as personal computers (PCs) used by users. That is, the terminals 15A, 15B, 15C . . . are examples of an information processing device belonging to the first system. Hereinafter, the terminals 15A, 15B, 15C . . . may be referred to as terminals 15 if they are not to be discriminated from one another.

The honey network system 2 includes the NAT router 20, the terminals 22A, 22B . . . , and servers 23A, 23B . . . .

The NAT router 20 is a router device that translates IP addresses and the like to connect the network 13A to networks 21A and 21B in the honey network system 2.

The network 21A is a network, with a CIDR notation of, for example, 192.168.3.0/24, to which the servers 23A, 23B . . . in the honey network system 2 belong. The network 21B is a network, with a CIDR notation of, for example, 192.168.2.0/24, to which the terminals 22A, 22B . . . in the honey network system 2 belong.

The terminals 22A, 22B . . . , which belong to the honey network system 2, are information processing devices prepared so as to correspond to the terminals 15A, 15B . . . in the company network system 1. For example, for each of the terminals 22A, 22B . . . , the same network name and IP address as those of the corresponding terminals 15A, 15B . . . are set in the network 21B of 192.168.2.0/24, which is the same CIDR notation as used for the terminals 15A, 15B . . . . For example, the terminal 22A has the same network name and IP address as the terminal 15A, and the terminal 22B has the same network name and IP address as the terminal 15B. In terms of the MAC addresses, the terminal 22A and the terminal 15A, as well as the terminal 22B and the terminal 15B, differ from each other.

The servers 23A, 23B . . . , which belong to the honey network system 2, are server devices prepared so as to correspond to the servers 14A, 14B . . . in the company network system 1. For example, for each of the servers 23A, 23B . . . , the same network name and IP address as those of the corresponding servers 14A, 14B . . . are set in the network 21A of 192.168.3.0/24, which is the same CIDR notation as used for the servers 14A, 14B . . . . For example, the server 23A has the same network name and IP address as the server 14A, and the server 23B has the same network name and IP address as the server 14B. In terms of the MAC addresses, the server 23A and the server 14A, as well as the server 23B and the server 14B, differ from each other.

In such a manner, the terminals 22A, 22B . . . in the honey network system 2 mimic the terminals 15A, 15B . . . of the company network system 1, respectively, the servers 23A, 23B . . . of the honey network system 2 mimic the servers 14A, 14B . . . of the company network system 1, respectively, and the honey network system 2 is a system that mimics the company network system 1.

If the user (for example, a network administrator) of the company network system 1 has not detected the terminal 15 infected with malware, the user sets the flow table 103A for performing operations in a normal mode, in which sending and receiving of packets between the company network system 1 and the honey network system 2 is interrupted, in the OpenFlow switch 10 by the OpenFlow controller 11. Thus, in the normal mode, sending and receiving of packets between the company network system 1 and the honey network system 2 is interrupted by the OpenFlow switch 10.

It is assumed that the terminal 15 infected with malware (in the present embodiment, assuming that the terminal 15C is infected with malware) has been detected by a malware detection program or the like. In this case, the user sets the flow table 103A for performing operations in a deception mode, in which packets sent and received by the terminal 15C infected with malware are directed to the honey network system 2, in the OpenFlow switch 10 by the OpenFlow controller 11.

For example, the flow table 103A is set as follows. •To interrupt address resolution protocol (ARP) frames from the terminal 22 of the honey network system 2 to the terminal 15C infected with malware, and to permit passage of ARP frames from the terminals 15A, 15B . . . of the company network system 1 to the terminal 15C. •To forward ARP frames from the NAT router 20 of the honey network system 2 as usual. •To forward (to change the output port) communication from the terminal 15C infected with malware to the terminals 15A, 15B . . . to the terminals 22A, 22B . . . of the honey network system 2. At this point, the destination MAC addresses from the terminal 15C are overwritten to those of the terminals 22A, 22B . . . . •For communication from the terminal 22 of the honey network system 2 to the terminal 15C infected with malware, to overwrite the source MAC address from that of the terminal 22 to that of the terminal 15. •To forward (to change the output port) communication from the terminal 15C infected with malware to the server 14 to the NAT router 20 of the honey network system 2. At this point, the destination MAC address is overwritten from that of the NAT router 12 to that of the NAT router 20. •For communication from the server 23 of the honey network system 2 to the terminal 15C infected with malware, to overwrite the source MAC address from that of the NAT router 20 to that of the NAT router 12. •For communication destined for the external network 3 from the terminal 15C infected with malware, to permit passage of the communication remaining unchanged (to maintain the communication path as in the normal mode).

Thereby, in the deception mode, the terminal 15C infected with malware is isolated into the honey network system 2 by the OpenFlow switch 10. For example, the terminal 15C infected with malware is not physically shifted from the company network system 1 to the honey network system 2 but is logically shifted as if the terminal 15C were in the honey network system 2 on the network.

In this way, the terminal 15C infected with malware is isolated into the honey network system 2, and therefore an attack using the terminal 15C as a jump server may be inhibited from reaching other devices in the company network system 1. Accordingly, the user (for example, a network administrator) of the company network system 1 may safely monitor the behavior of the terminal 15C infected with malware and may safely collect CTI.

Figure 3:
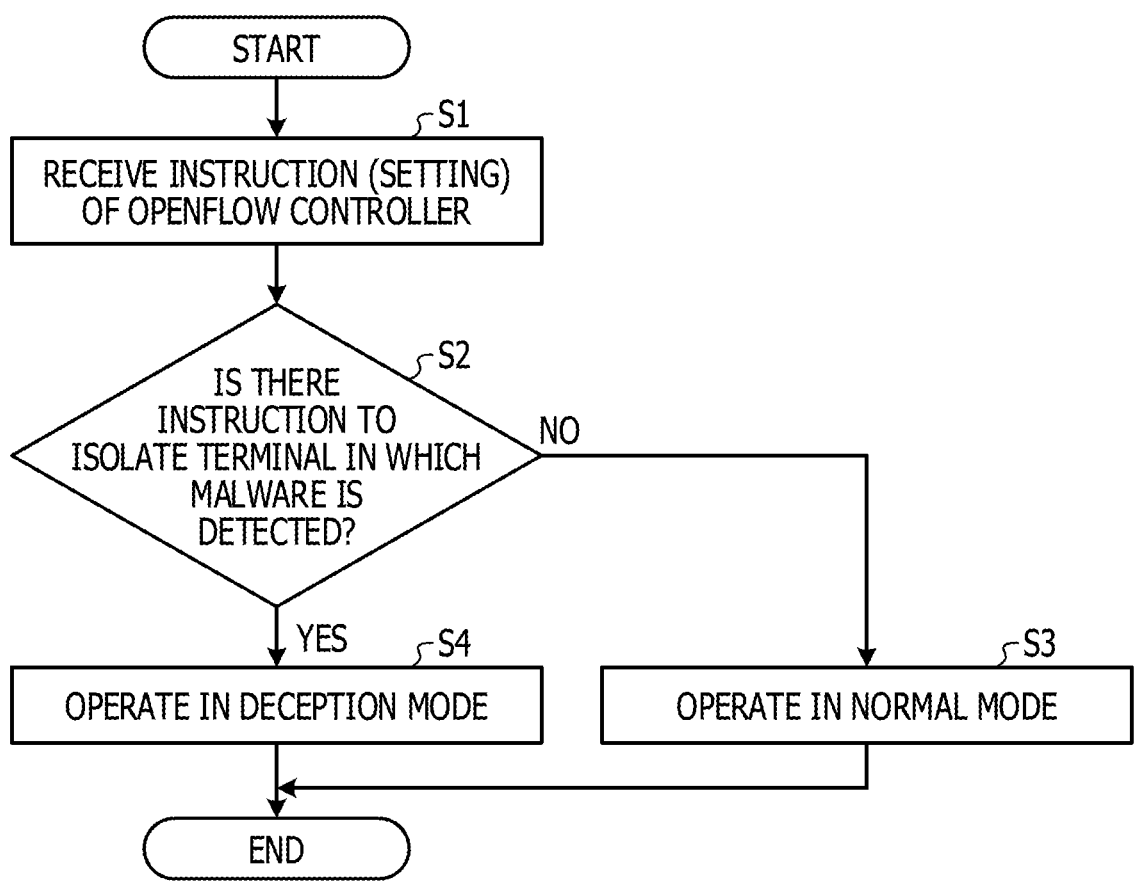
FIG. 3 is a flowchart illustrating an example of operations of a communication device according to an embodiment.

The operations of the OpenFlow switch 10 will now be described in detail. FIG. 3 is a flowchart illustrating an example of operations of the OpenFlow switch 10 according to the embodiment. As illustrated in FIG. 3, upon start-up of the process, the control unit 102 receives an instruction (setting) of the OpenFlow controller 11 (S1) and stores the instructed flow table 103A in the storage unit 103.

For setting of the flow table 103A, the flow table 103A that supports the normal mode and, for every terminal 15, the flow table 103A for switching to the deception mode may be stored in advance in the storage unit 103. In this case, in S1, an instruction whether to maintain the normal mode or to cause a given terminal 15 to switch to the deception mode is received.

Subsequently, under the instruction received in S1, the control unit 102 determines whether there is an instruction to isolate the terminal 15 in which malware is detected (for example, the terminal 15C) (S2).

For example, if the received instruction indicates the flow table 103A that supports the normal mode (S2: NO), the control unit 102 references the instructed flow table 103A and operates in the normal mode (S3).

If the received instruction indicates the flow table 103A that supports the deception mode for isolating the terminal 15C infected with malware (S2: YES), the control unit 102 references the instructed flow table 103A and operates in the deception mode (S4).

Figure 4:
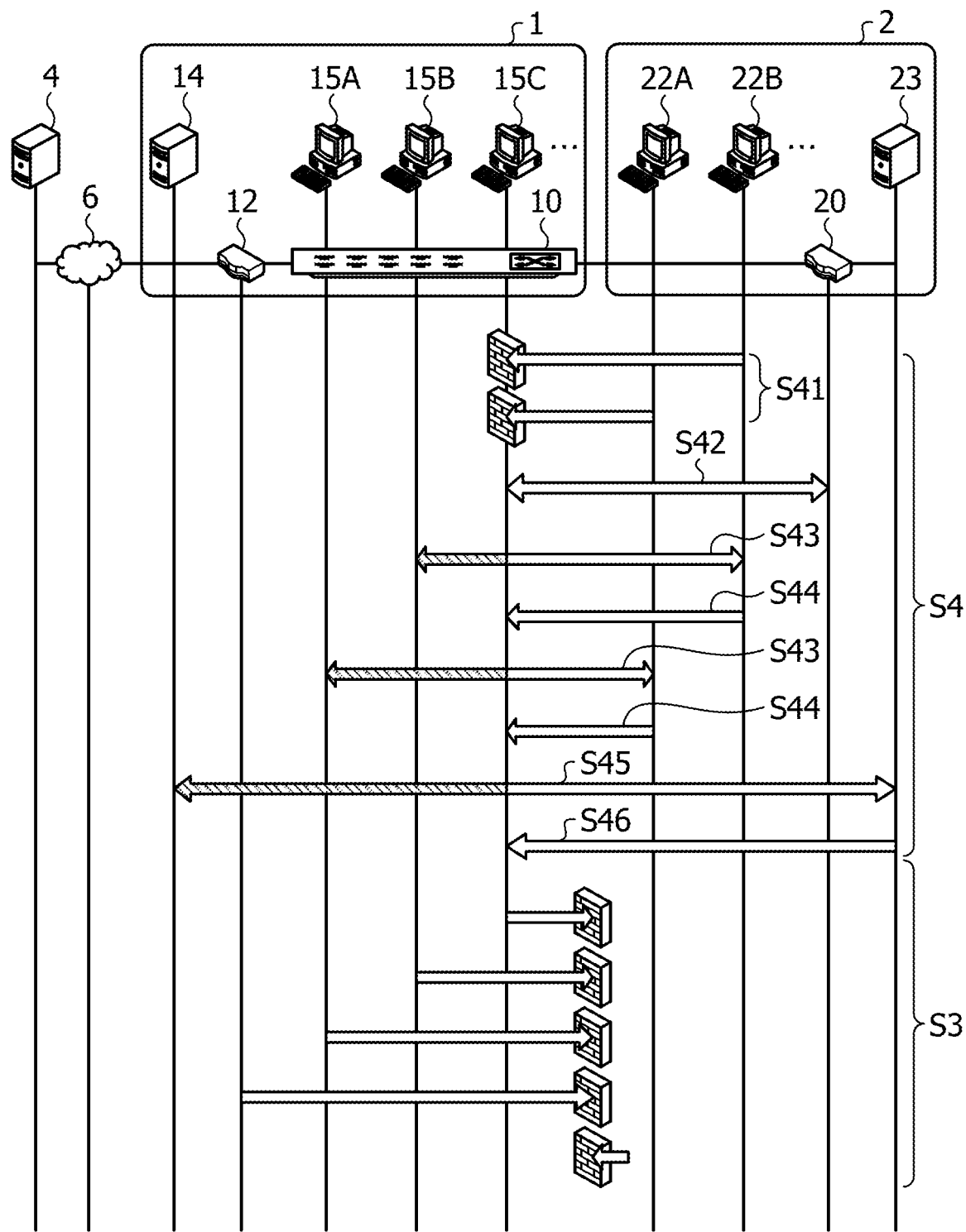
FIG. 4 is a diagram illustrating operations in a normal mode and in a deception mode.

FIG. 4 is a diagram illustrating operations in the normal mode and in the deception mode.

As illustrated in FIG. 4, in the normal mode (S3), sending and receiving of packets between the company network system 1 and the honey network system 2 is interrupted in the OpenFlow switch 10. Sending and receiving of packets is permitted within the company network system 1.

Figure 5:
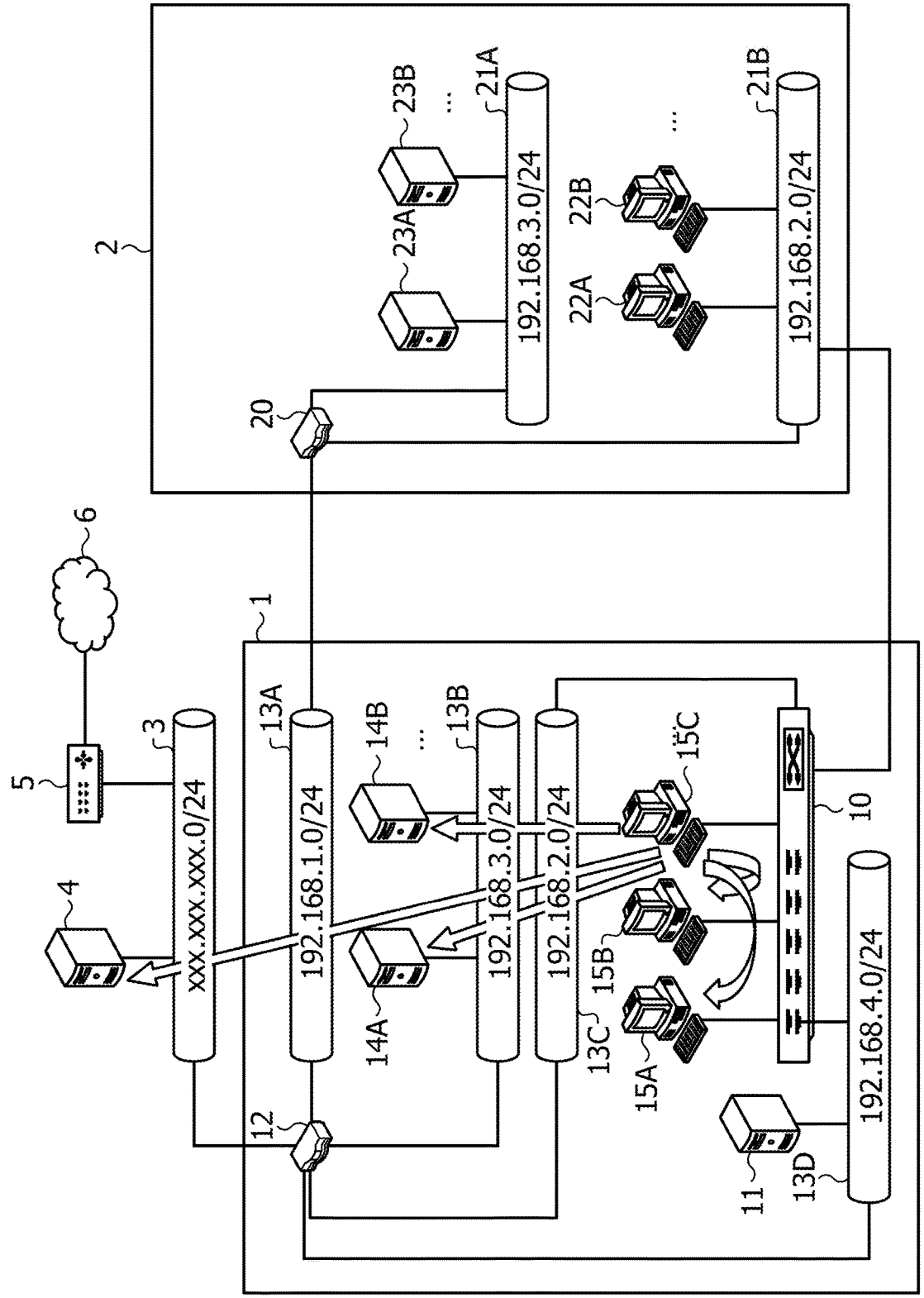
FIG. 5 is a diagram illustrating communication in a normal mode.

FIG. 5 is a diagram illustrating communication in the normal mode. As illustrated in FIG. 5, in the normal mode, communication, for example, from the terminal 15C to the servers 14A, 14B . . . , the terminals 15A, 15B . . . , and the external network 3 is permitted.

With reference now to FIG. 4, in the deception mode (S4), the OpenFlow switch 10 intercepts ARP frames from the terminals 22A, 22B . . . of the honey network system 2 to the terminal 15C infected with malware (S41). As in the normal mode, the OpenFlow switch 10 permits passage of ARP frames from the terminals 15A, 15B . . . to the terminal 15C in the company network system 1.

The OpenFlow switch 10 forwards ARP frames from the NAT router 20 of the honey network system 2 as usual (S42).

For communication from the terminal 15C infected with malware to the terminals 15A, 15B . . . (S43), the OpenFlow switch 10 forwards (changes the output port) the communication to the terminals 22A, 22B . . . of the honey network system 2. At this point, the destination MAC addresses are overwritten from those written for the communication from the terminal 15C to those of the terminals 22A, 22B . . . .

For communication from the terminals 22A, 22B . . . of the honey network system 2 to the terminal 15C infected with malware (S44), the OpenFlow switch 10 forwards the communication to the terminal 15C in such a way that the source MAC addresses are overwritten from those of the terminals 22A, 22B . . . to those of the terminals 15A, 15B . . . .

For communication from the terminal 15C infected with malware to the server 14 (S45), the OpenFlow switch 10 forwards (changes the output port) the communication to the NAT router 20 of the honey network system 2. At this point, the destination MAC address is overwritten from that of the NAT router 12 to that of the NAT router 20. Thereby, the communication from the terminal 15C infected with malware to the server 14 is forwarded to the server 23.

For communication from the server 23 of the honey network system 2 to the terminal 15C infected with malware (S46), the OpenFlow switch 10 sends the communication to the terminal 15C in such a way that the source MAC address is overwritten from that of the NAT router 20 to that of the NAT router 12.

Figure 6:
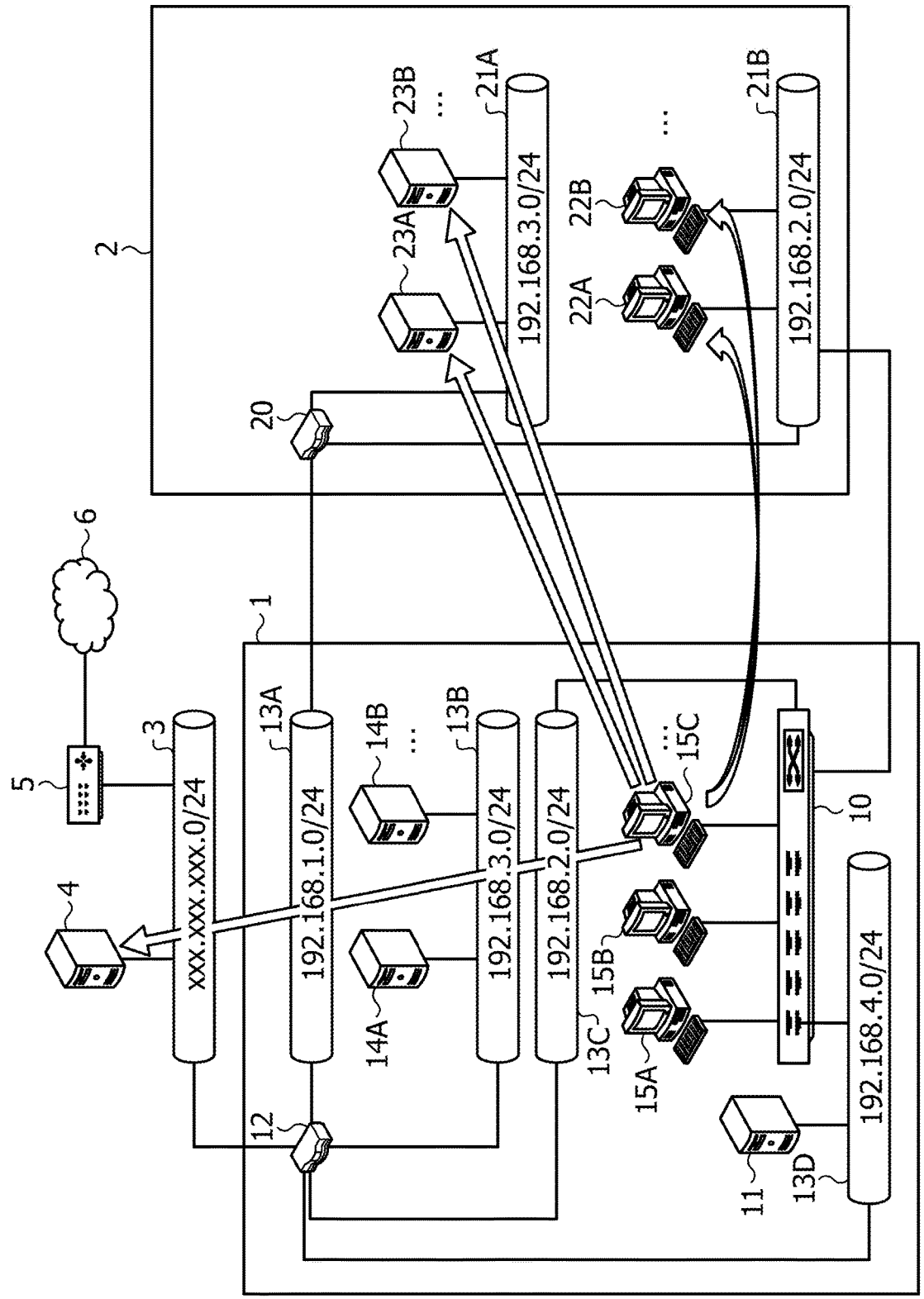
FIG. 6 is a diagram illustrating communication in a deception mode.

FIG. 6 is a diagram illustrating communication in the deception mode. As illustrated in FIG. 6, in the deception mode, the terminal 15C infected with malware is logically shifted as if the terminal 15C were in the honey network system 2 on the network.

For example, communication from the terminal 15C toward the servers 14A and 14B is forwarded to the servers 23A and 23B, which correspond to the servers 14A and 14B, in the honey network system 2. Communication from the terminal 15C toward the terminals 15A and 15B is forwarded to the terminals 22A and 22B, which correspond to the terminals 15A and 15B, in the honey network system 2. Communication from the terminal 15C destined for the external network 3 (for example, communication to the C&C server 4) is permitted to remain unchanged.

As described above, the OpenFlow switch 10 includes the receiving processor 102A that receives packets sent by the information processing device (the terminal 15 or the terminal 22) belonging to the company network system 1 or the honey network system 2. The OpenFlow switch 10 includes the sending processor 102B. Upon receiving packets destined for the server 14 and the terminals 15A, 15B . . . from the terminal 15C that belongs to the company network system 1 and in which malware is detected, the sending processor 102B sends the packets in such a way that the destination addresses of the packets are changed to addresses corresponding to the server 23 and the terminals 22A, 22B . . . belonging to the honey network system 2.

Thus, the OpenFlow switch 10 forwards access within the company network system 1 from the terminal 15C infected with malware in the company network system 1 to the honey network system 2, and thereby may inhibit an attack using the terminal 15 as a jump server from reaching other devices in the company network system 1. Accordingly, the user (for example, a network administrator) of the company network system 1 may safely monitor the behavior of the terminal 15C infected with malware and may safely collect CTI.

When the sending processor 102B receives packets destined for the terminal 15C from the terminals 22A, 22B . . . belonging to the honey network system 2, the sending processor 102B sends the packets to the terminal 15C in such a way that the source addresses (for example, the MAC addresses) are changed to addresses corresponding to the terminals 15A, 15B . . . belonging to the company network system 1. When the sending processor 102B receives a packet destined for the terminal 15C via the NAT router 20 from the server 23 belonging to the honey network system 2, the sending processor 102B sends the packet to the terminal 15C in such a way that the source address (for example, the MAC address) is changed to an address corresponding to the NAT router 12 belonging to the company network system 1. Accordingly, the OpenFlow switch 10 may forward access to the terminal 15C from the terminals 22A, 22B . . . and the server 23 belonging to the honey network system 2 to the terminal 15C.

When a packet received from the terminal 15C infected with malware in the company network system 1 is destined for the external network 3, the sending processor 102B sends the packet without changing the destination address of the packet. This enables the OpenFlow switch 10 to continue communication between the terminal 15C infected with malware and the C&C server 4. Accordingly, the user (for example, a network administrator) of the company network system 1 may monitor the behavior of the terminal 15C in a situation where communication between the terminal 15C infected with malware and the C&C server 4 is continued.

When the sending processor 102B receives a packet destined for the terminal 15A from the terminal 15C in which malware is detected, the sending processor 102B changes the destination address (for example, the MAC address) of the packet to an address corresponding to the terminal 22A, which mimics the terminal 15A, to send the packet to the terminal 22A. This enables the user (for example, a network administrator) to monitor access from the terminal 15C, in which malware is detected, to the inside of the honey network system 2, which mimics the company network system 1, to safely collect CTI.

Each component of each device illustrated in the drawings may not be physically configured as strictly as illustrated in the drawings. That is, the specific forms of distribution and integration of devices are not limited to those illustrated in the drawings, and all or some of the devices may be configured to be functionally or physically distributed and integrated in arbitrary units in accordance with various loads and usage states.

Figure 7:
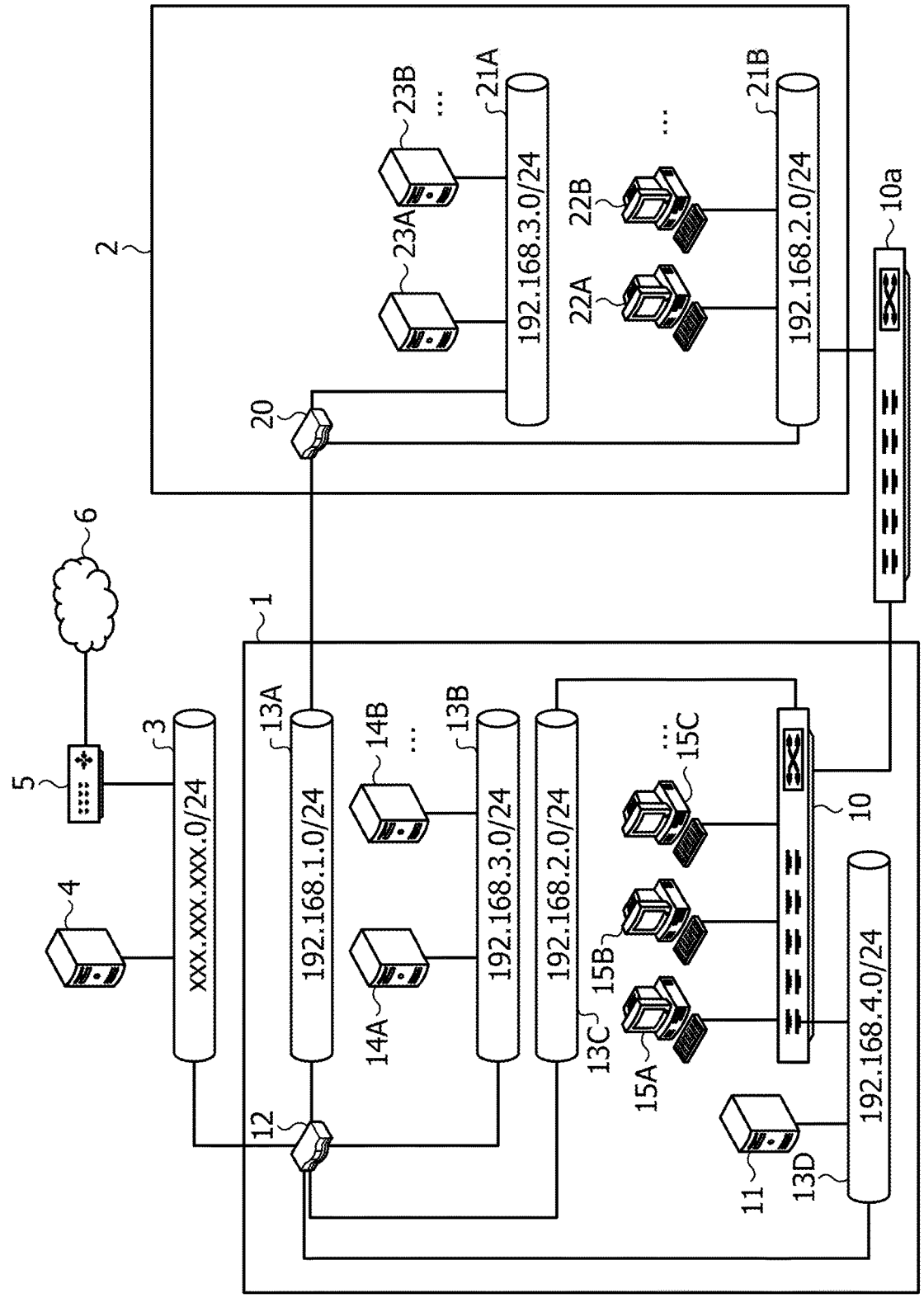
FIG. 7 is a diagram illustrating an example of a configuration of a system.

FIG. 7 is a diagram illustrating an example of a configuration of a system and, for example, is an example of a modification in which OpenFlow switches are distributed. For example, as illustrated in FIG. 7, regarding OpenFlow switches, a configuration in which two switches, the OpenFlow switch 10 mainly connected to the company network system 1 and an OpenFlow switch 10a connected to the honey network system 2, are included may be employed. In this case, connecting the ports of the OpenFlow switches 10 and 10a to each other results in connecting the company network system 1 to the honey network system 2. Distributing OpenFlow switches in such a manner enables network connection in each system to be effectively managed.

Regarding various processing functions performed in the company network system 1, all or any part of the various processing functions may be executed on a central processing unit (CPU) (or a microcomputer such as a microprocessing unit (MPU) or a micro controller unit (MCU)). It is to be understood that all or any part of the various processing functions may be executed on programs analyzed and executed by a CPU (or a microcomputer such as an MPU or an MCU) or on hardware using wired logic.

Figure 8:
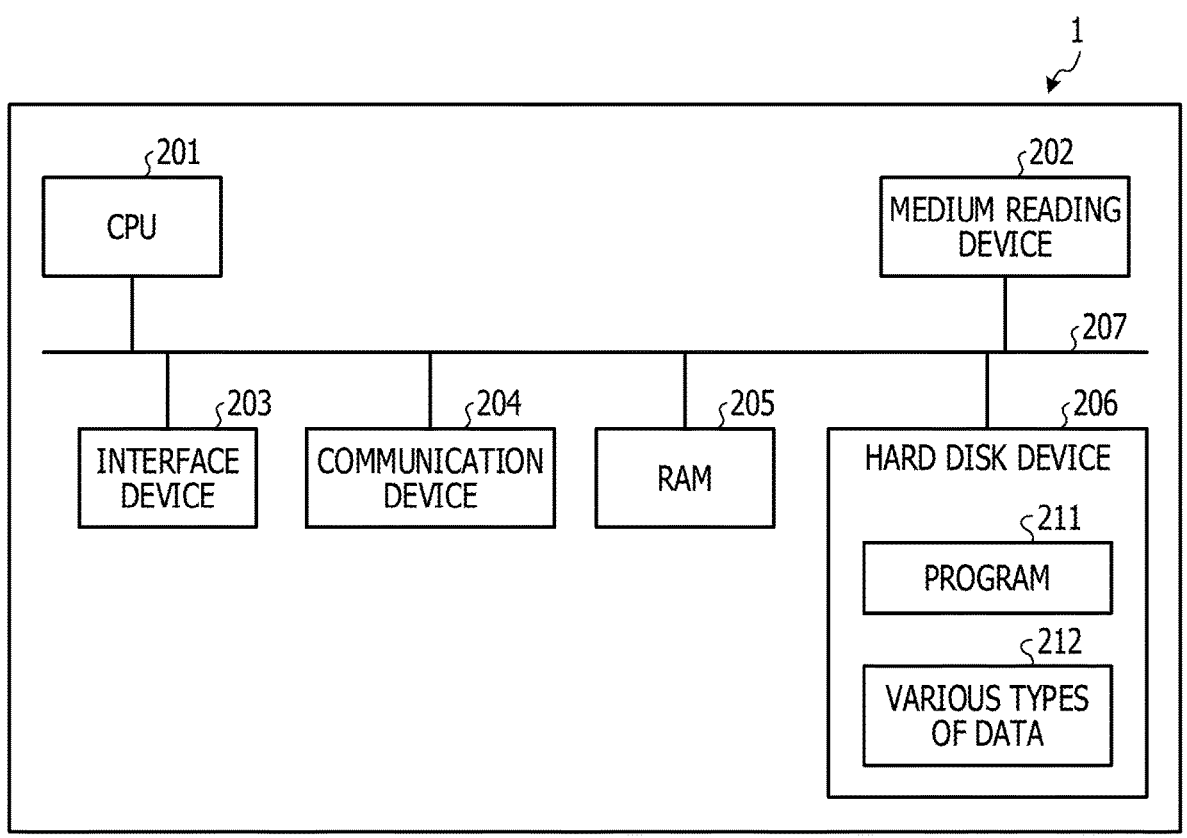
FIG. 8 is a block diagram illustrating an example of a hardware configuration of an information processing device according to an embodiment.

Various processing described in the above embodiment may be implemented by executing programs prepared in advance by a computer. Hereinafter, an example of a computer (hardware) that executes programs having functions similar to those of the above embodiment will be described. FIG. 8 is a block diagram illustrating an example of a hardware configuration of an information processing device (or a communication device such as the OpenFlow switch 10) according to the embodiment.

As illustrated in FIG. 8, the company network system 1 includes a CPU 201, which executes various computation processes, and a medium reading device 202, which reads programs and the like from a recording medium. The company network system 1 includes an interface device 203 for coupling to various devices and a communication device 204 for communicative coupling to external devices in a wired or wireless manner. The company network system 1 includes a random-access memory (RAM) 205 and a hard disk device 206. The units (201 to 206) in the company network system 1 are coupled to a bus 207.

In the hard disk device 206, a program 211 including a plurality of instructions for executing various processes by using the receiving processor 102A and the sending processor 102B in the control unit 102 described in the above embodiment is stored. In the hard disk device 206, various types of data 212 that are referenced by the program 211 are stored. The communication device 204, which is connected to the networks 13C, 13D, and 21B and the like, such as local area networks (LANs), exchange various types of information between devices via the networks 13C, 13D, and 21B and the like.

The CPU 201 reads the program 211 stored in the hard disk device 206, loads the program 211 into the RAM 205, and executes the program 211, performing various processes. The program 211 may not be necessarily stored in the hard disk device 206. For example, the company network system 1 may read and execute the program 211 stored in a readable storage medium. The storage medium readable by the company network system 1 corresponds to, for example, a portable recording medium such as a compact disc read-only memory (CD-ROM), a digital video disc (DVD), or a universal serial bus (USB) memory, a semiconductor memory such as a flash memory, a hard disk drive, or the like. The program 211 may be stored in a device connected to a public line, the Internet, a LAN, or the like, and the company network system 1 may read the program 211 from the device and execute the program 211.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A malware inspection apparatus comprising:
   one or more memories; and
   one or more processors coupled to the one or more memories and the one or more processors configured to
      identify a first terminal belonging to a first system which includes a first network, and a second terminal belonging to a first system,
      identify a third terminal belonging to a second system, an Internet Protocol (IP) address of the second terminal and the IP address of the third terminal being a same, a Media Access Control (MAC) address of the second terminal and the MAC address of the third terminal being different,
      determine whether an instruction received from the first network is for isolating the first terminal from the first network based on a table stored in the one or more memories that indicates types of the instruction,
      when the first terminal belonging to the first system is infected with malware and the instruction is for isolating, in response to receiving, from the first terminal, a first packet destined for the second terminal belonging to the first system, change the MAC address of the first packet to the MAC address of a third terminal belonging to a second system,
      send the changed first packet to the third terminal, and
      when a second packet received from the first terminal destined for an external network of the first network and the instruction is not for isolating, send the second packet without changing a MAC address of the second packet.

2. The malware inspection apparatus according to claim 1, wherein
   the one or more processors configured to
      when the first terminal is infected with malware, in response to receiving, from the third terminal or a fourth terminal belonging to the second system, a second packet destined for the first terminal, change a source address of the second packet to an address of a fifth terminal belonging to the first system, and send the changed second packet to the first terminal.

3. The malware inspection apparatus according to claim 1, wherein
   the second system is a system that mimics the first system, and
   the third terminal is a terminal that mimics the second terminal.

4. The malware inspection apparatus according to claim 1, wherein communication of a packet between the first system and the second system is inhibited until infection by malware is detected.

5. A computer-implemented malware inspection method comprising:
   identifying a first terminal belonging to a first system which includes a first network, and a second terminal belonging to a first system;
   identifying a third terminal belonging to a second system, an Internet Protocol (IP) address of the second terminal and the IP address of the third terminal being a same, a Media Access Control (MAC) address of the second terminal and the MAC address of the third terminal being different;
   determining whether an instruction received from the first network is for isolating the first terminal from the first network based on a table stored in the one or more memories that indicates types of the instruction;
   when the first terminal belonging to the first system is infected with malware and the instruction is for isolating, in response to receiving, from the first terminal, a first packet destined for the second terminal belonging to the first system, changing the MAC address of the first packet to the MAC address of a third terminal belonging to a second system;
   sending the changed first packet to the third terminal; and
   when a second packet received from the first terminal destined for an external network of the first network and the instruction is not for isolating, sending the second packet without changing a MAC address of the second packet.

6. The malware inspection method according to claim 5, further comprising:
   when the first terminal is infected with malware, in response to receiving, from the third terminal or a fourth terminal belonging to the second system, a second packet destined for the first terminal, changing a source address of the second packet to an address of a fifth terminal belonging to the first system; and
   sending the changed second packet to the first terminal.

7. The malware inspection method according to claim 5, wherein
   the second system is a system that mimics the first system, and
   the third terminal is a terminal that mimics the second terminal.

8. The malware inspection method according to claim 5, wherein communication of a packet between the first system and the second system is inhibited until infection by malware is detected.

9. A non-transitory computer-readable medium storing instructions executable by one or more computer, the instructions comprising:
- one or more instructions for identifying a first terminal belonging to a first system which includes a first network, and a second terminal belonging to a first system;
- one or more instructions for identifying a third terminal belonging to a second system, an Internet Protocol (IP) address of the second terminal and the IP address of the third terminal being a same, a Media Access Control (MAC) address of the second terminal and the MAC address of the third terminal being different;
- one or more instructions for determining whether an instruction received from the first network is for isolating the first terminal from the first network based on a table stored in the one or more memories that indicates types of the instruction;
- one or more instructions for sending the changed first packet to the third terminal; and
- one or more instructions for, when a second packet received from the first terminal destined for an external network of the first network and the instruction is not for isolating, sending the second packet without changing a MAC address of the second packet.

* * * * *